(12) United States Patent
Grammel

(10) Patent No.: US 9,264,131 B1
(45) Date of Patent: Feb. 16, 2016

(54) FAST RE-ROUTE FOR OPTICAL NETWORKS

(71) Applicant: Juniper Networks, Inc., Sunnyvale, CA (US)

(72) Inventor: Gert Grammel, Ditzingen (DE)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 14/616,447

(22) Filed: Feb. 6, 2015

Related U.S. Application Data

(63) Continuation of application No. 13/403,832, filed on Feb. 23, 2012, now Pat. No. 8,953,433.

(51) Int. Cl.
  *H04L 12/06* (2006.01)
  *H04L 12/28* (2006.01)
  *H04B 10/038* (2013.01)
(52) U.S. Cl.
  CPC .................................. *H04B 10/038* (2013.01)
(58) Field of Classification Search
  None
  See application file for complete search history.

(56) References Cited

U.S. PATENT DOCUMENTS

| 8,953,433 B1 | 2/2015 | Grammel |
| 2009/0040921 A1 | 2/2009 | Gan et al. |
| 2010/0315943 A1 | 12/2010 | Chao et al. |

OTHER PUBLICATIONS

Mannie, "Generalized Multi-Protocol Label Switching (GMPLS) Architecture," RFC 3945, Oct. 2004, 62 pp.
Mannie, et al., "Generalized Mutli-Protocol Label Switching (GMPLS) Extensions for Synchronous Optical Network (SONET) and Synchronous Digital Hierarchy (SDH) Control," RFC 3946, Oct. 2004, 27 pp.
Prosecution History from U.S. Appl. No. 13/403,832, from Dec. 19, 2013 through Oct. 9, 2014, 74 pp.

*Primary Examiner* — Kevin C Harper
*Assistant Examiner* — Derrick V Rose
(74) *Attorney, Agent, or Firm* — Shumaker & Sieffert, P.A.

(57) ABSTRACT

An optical network device re-routes traffic from a path to a backup path in response to determining that a downstream segment of the primary path is not operational. The optical network device receives traffic on a slot of an optical fiber. For each data unit in the traffic, the optical network device determines, based on receiving the data unit on the slot and based on a flow identifier specified in the data unit, that a given path is associated with the data unit. If a downstream segment of the given path is not operational, the optical network device routes the data unit onto a backup path instead of routing the data unit along the given path. Bandwidth is not reserved for the backup path.

29 Claims, 9 Drawing Sheets

FAST RE-ROUTE FOR OPTICAL NETWORKS

This application is a continuation of U.S. patent application Ser. No. 13/403,832, filed Feb. 23, 2012, the entire content of which is incorporated herein by reference.

TECHNICAL FIELD

The techniques of this disclosure relate to optical networks and, more specifically, to handling traffic within optical networks.

BACKGROUND

Multi-protocol Label Switching (MPLS) is a mechanism used to engineer traffic patterns within Internet Protocol (IP) networks. By using MPLS, a source device can request a path through a network, i.e., a Label Switched Path (LSP). An LSP defines a distinct path through the network to carry MPLS packets from the source device to a destination device. A short label associated with a particular LSP is affixed to packets that travel through the network via the LSP. Routers along the path cooperatively perform MPLS operations to forward the MPLS packets along the established path. LSPs may be used for a variety of traffic engineering purposes including bandwidth management and quality of service (QoS). A packet may be a formatted set of data.

A variety of protocols exist for establishing LSPs. For example, one such protocol is the label distribution protocol (LDP). Another type of protocol is a resource reservation protocol, such as the Resource Reservation Protocol with Traffic Engineering extensions (RSVP-TE). RSVP-TE uses constraint information, such as bandwidth availability, to compute paths and establish LSPs along the paths within a network. RSVP-TE may use bandwidth availability information accumulated by a link-state interior routing protocol, such as the Intermediate System—Intermediate System (ISIS) protocol or the Open Shortest Path First (OSPF) protocol.

Head-end routers of an LSP are commonly known as ingress routers, while routers at the tail-end of the LSP are commonly known as egress routers. Ingress and egress routers, as well as intermediate routers along the LSP that support MPLS, are referred to generically as label switching routers (LSRs). A set of packets to be forwarded along the LSP is referred to as a forwarding equivalence class (FEC). A plurality of FECs may exist for each LSP, but there may be only one active LSP for any given FEC. Typically, a FEC definition includes the IP address of the destination of the LSP. The ingress label edge router (LER) uses routing information, propagated from the egress LER, to determine the LSP, to assign labels for the LSP, and to affix a label to each packet of the FEC. The LSRs use MPLS protocols to receive MPLS label mappings from downstream LSRs and to advertise MPLS label mappings to upstream LSRs. When an LSR receives an MPLS packet from an upstream router, the LSR switches the MPLS label according to the information in the LSR's forwarding table and forwards the packet to the appropriate downstream LSR or LER. The egress LER removes the label from the packet and forwards the packet to its destination in accordance with standard routing protocols.

In general, each router along the LSP maintains a context that associates a FEC with an incoming label and an outgoing label. In this manner, when an LSR receives a labeled packet, the LSR may swap the label (i.e., the incoming label) with the outgoing label by performing a lookup in the context. The LSR may then forward the packet to the next LSR or LER along the LSP. The next router along the LSP is commonly referred to as a downstream router or a next hop.

Generalized MPLS (GMPLS) differs from traditional MPLS in that GMPLS supports types of switching in addition to the label switching described above. For instance, GMPLS supports time-division switching and wavelength-division switching. Because GMPLS supports these additional types of switching, GMPLS enables network devices to route data along pre-defined paths through optical networks. These paths may act like virtual circuits. Optical networks are networks of devices that are connected via optical fibers. GMPLS is defined in Internet Engineering Task Force (IETF) Request for Comments (RFC) 3945, available at http://www.ietf.org/rfc/rfc3945.txt, the entire content of which is hereby incorporated by reference.

In a time-division switching optical network, time is divided into a series of time periods of equal duration. Each of these time periods is further divided into time slots of equal duration. Similarly, in a wavelength-division switching network, a wavelength spectrum is divided into wavelengths, each wavelength representing a different slot for transmission of data. Optical network devices that support GMPLS reserve slots and utilize MPLS protocols to distribute labels, which causes the optical network devices to reserve corresponding slots, thereby establishing paths through the optical network. For example, an optical network device may reserve a first time slot of each time period for a first path through the network, a second time slot of each time period for a second path, and so on. Once a label is allocated and defined for a slot, that slot is exclusively reserved for the particular path defined through the optical network. In this way, the optical devices maintain a one-to-one correspondence between MPLS labels that are allocated in the control plane to define paths within the optical network and slots within the data plane for optically communicating data associated with the defined paths.

In GMPLS, the optical network devices exchange messages, typically via RSVP-TE, to request paths and exchange labels for slots reserved for the paths. The messages are typically communicated between the optical devices via a separate packet-switched data communication network. As an optical network device receives traffic on a slot reserved for a particular path, the device forwards the data units according to a forwarding rule for the particular path. The forwarding rule for the particular path may be established when the labels for the path where originally exchanged between the optical devices. For example, as the device receives traffic on a slot reserved for a first path, the device forwards the traffic according to a forwarding rule for the first path. In this example, as the same device receives traffic on a slot reserved for a second path, the device forwards the traffic received on the slot reserved for the second path according to a forwarding rule for the second path. In this way, the slot on which a device receives traffic may serve a function similar to a physical MPLS label carried in the data plane by packet-switched MPLS networks.

In some cases, an optical fiber or port associated with the optical fiber may break or otherwise become non-operational, causing the network devices to reroute the data along a different path within the optical network. For example, in response, optical network devices immediately upstream from the point of failure may exchange path configuration messages in the control plane to disseminate new label information to allocate slots of different optical ports so as to steer the traffic and bypass the failed link. However, exchange of control plane signaling messages to reroute the GMPLS traffic in the optical network can be slow compared to the desired transport speed of the optical network.

SUMMARY

In general, this disclosure describes techniques for quickly re-rerouting traffic to backup paths within optical networks. A device in an optical network has a plurality of ports, each connected to an optical fiber. Each of the optical fibers has a plurality of physical slots. The device stores a forwarding rule for a path that passes through the device. The forwarding rule specifies a primary downstream slot and a primary downstream port. If a downstream segment of the path is operational, the device forwards data units associated with the path on the primary downstream slot of the optical fiber connected to the primary downstream port.

The forwarding rule also specifies a backup downstream slot and a backup downstream port. Because the number of physical slots on the optical fiber connected to the backup downstream port is limited, the forwarding rule does not specify, and thereby reserve, a physical slot of the optical fiber as the backup downstream slot. Rather, the forwarding rule specifies a virtual slot of the optical fiber. When the downstream segment of the path is non-operational, the device identifies a physical slot that corresponds to the virtual slot specified by the forwarding rule as the backup downstream slot. The device then forwards data units associated with the path on the identified physical slot of the optical fiber connected to the backup downstream port.

The identified physical slot may or may not already be reserved for another path. Accordingly, the data units received on the physical slot may include flow identifiers. Devices may use the flow identifiers in the data units to identify the paths with which the data units are associated.

This disclosure describes a method that comprises receiving, at an optical network device, traffic on a physical slot of a first optical fiber, the first optical fiber connected to a first port of the optical network device, the traffic including a given data unit. The method also comprises determining, based on the given data unit being received by the optical network device on the physical slot of the first optical fiber and based on a flow identifier specified by the given data unit, that the given data unit is associated with a first path. In addition, the method comprises determining whether a downstream segment of the first path is operational. Furthermore, the method comprises in response to determining that the downstream segment of the first path is not operational, identifying a virtual slot of a second optical fiber that is connected to the optical network device, the virtual slot of the second optical fiber reserved for a second path. The method also comprises identifying, based on the virtual slot of the second optical fiber, a physical slot of the second optical fiber. In addition, the method comprises forwarding the given data unit on the physical slot of the second optical fiber.

This disclosure also describes an optical network device comprising a first port and a second port. The optical network device also comprises a processor configured to receive traffic on a physical slot of a first optical fiber, the first optical fiber connected to the first port, the traffic including a given data unit. The processor is also configured to determine, based on the given data unit being received by the optical network device on the physical slot of the first optical fiber and based on a flow identifier specified by the given data unit, that the given data unit is associated with a first path. In addition, the processor is configured to determine whether a downstream segment of the first path is operational. The processor is also configured to identify, in response to determining that the downstream segment of the first path is not operational, a virtual slot of a second optical fiber, the second optical fiber connected to the second port, the virtual slot of the second optical fiber being reserved for a second path. In addition, the processor is configured to identify, based on the virtual slot of the second optical fiber, a physical slot of the second optical fiber. In addition, the processor is configured to forward the given data unit on the physical slot of the second optical fiber.

This disclosure also describes a computer-readable storage medium that comprises computer-executable instructions that, when executed, configure a processor of an optical network device to receive traffic on a physical slot of a first optical fiber, the first optical fiber connected to a first port of the optical network device, the traffic including a given data unit. The instructions, when executed, also configure the processor to determine, based on the given data unit being received by the optical network device on the physical slot of the first optical fiber and based on a flow identifier specified by the given data unit, that the given data unit is associated with a first path. In addition, the instructions, when executed, configure the processor to determine whether a downstream segment of the first path is operational. In response to determining that the downstream segment of the first path is not operational, the instructions configure the processor to identify a virtual slot of a second optical fiber that is connected to the optical network device, the virtual slot of the second optical fiber reserved for a second path. The instructions, when executed, also configure the processor to identify, based on the virtual slot of the second optical fiber, a physical slot of the second optical fiber. The instructions, when executed, also configure the processor to forward the given data unit on the physical slot of the second optical fiber.

The details of one or more examples are set forth in the accompanying drawings and the description below. Other features, objects, and advantages of the examples will be apparent from the description, drawings, and claims.

DETAILED DESCRIPTION

The attached drawings illustrate examples. Elements indicated by reference numbers in the attached drawings correspond to elements indicated by like reference numbers in the following description. In the attached drawings, ellipses indicate the presence of one or more elements similar to those separated by the ellipses. Furthermore, stacked elements in the attached drawings indicate the presence of one or more similar elements. Alphabetical suffixes on reference numbers for similar elements are not intended to indicate the presence of particular numbers of the elements. In this disclosure, elements having names that start with ordinal words (e.g., "first," "second," "third," and so on) do not necessarily imply that the elements have a particular order. Rather, such ordinal words are merely used to refer to different elements of a same or similar type.

Figure 1:
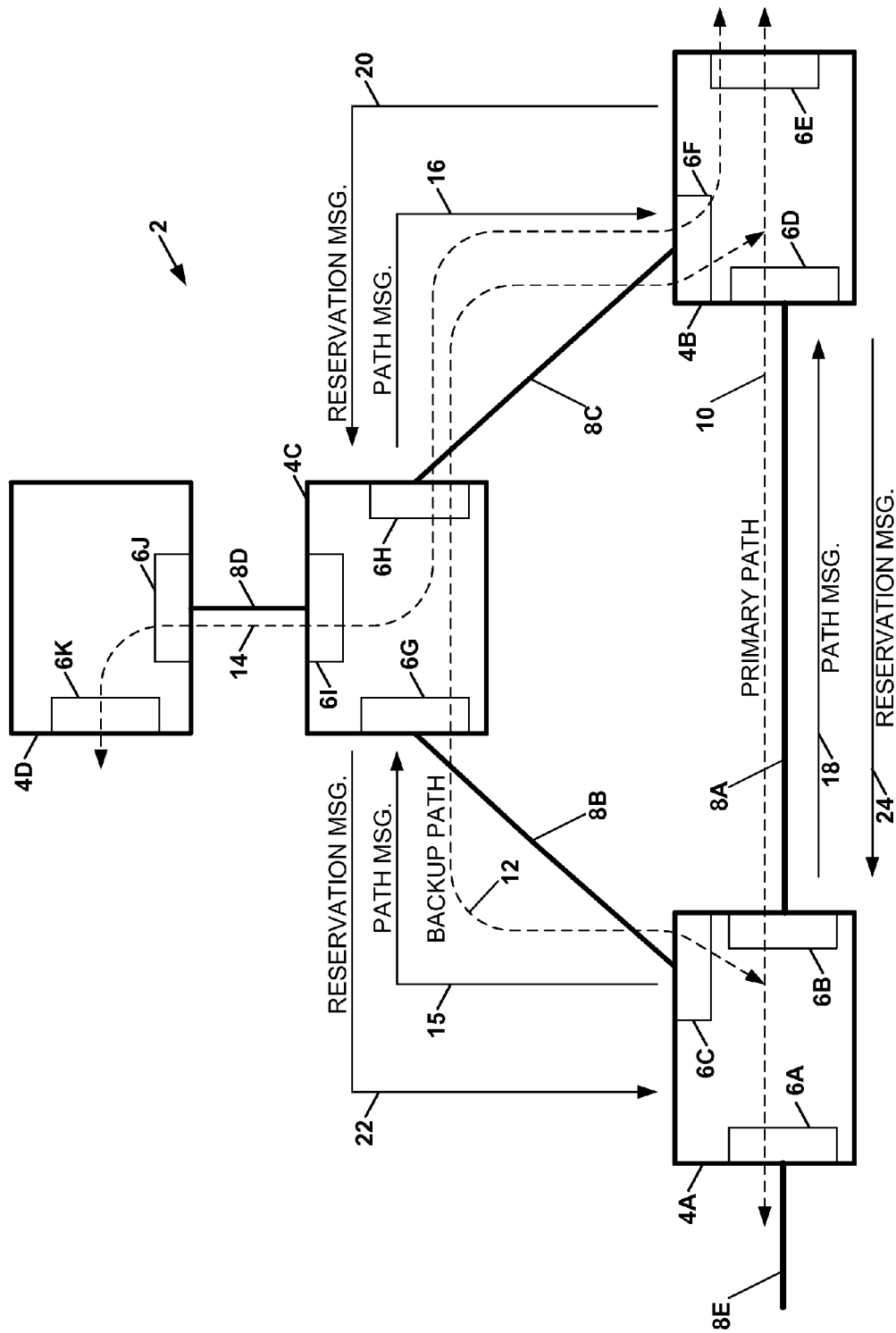
FIG. 1 is a block diagram that illustrates an example optical network system in which the techniques of this disclosure may be implemented.

FIG. 1 is a block diagram that illustrates an example optical network system 2 in which the techniques of this disclosure may be implemented. In the example of FIG. 1, optical network system 2 includes optical network devices 4A, 4B, 4C, and 4D (collectively, "optical network devices 4"). Each of optical network devices 4 may be an optical cross-connect device. In other examples, one or more of optical network devices 4 may be replaced by another type of network device. Optical network devices 4 may perform circuit-switching to route traffic (e.g., a flow of data units) along predefined paths (i.e., circuits, label switched paths, etc.) through optical network system 2. In some examples, the traffic may include a series of data units, such as cells or frames. The data units may contain various types of data. For example, one or more data units may contain data associated with a packet.

Optical network devices 4 each have multiple ports. Each of the ports may be a physical interface between an optical network device and one or more other devices. In the example of FIG. 1, optical network device 4A has ports 6A, 6B, and 6C. Optical network device 4B has ports 6D, 6E, and 6F. Optical network device 4C has ports 6G, 6H, and 6I. Optical network device 4D has ports 6J and 6K. In other examples, optical network devices 4 may include more or fewer ports than shown in the example of FIG. 1.

Optical network system 2 also includes optical fibers 8A through 8E (collectively, "optical fibers 8") interconnected via optical ports 6 as shown in FIG. 1. Although not shown in the example of FIG. 1, each of optical network devices 4 may be connected to additional devices via additional optical fibers.

Figure 2:
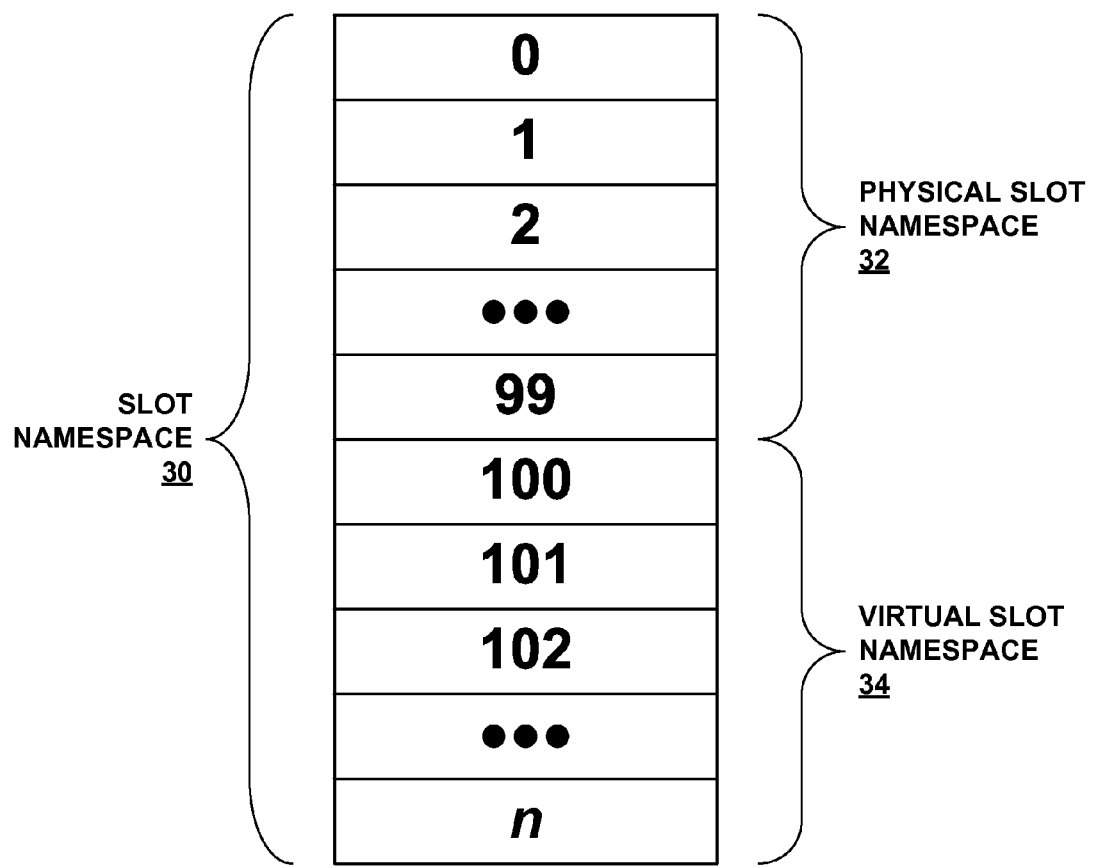
FIG. 2 is a conceptual diagram that illustrates an example slot namespace.

Each of optical fibers 8 is associated with a slot namespace. The slot namespace may be a set of identifiers of slots, i.e., slot identifiers. The slot namespace of an optical fiber may include slot identifiers for virtual slots of the optical fiber and physical slots of the optical fiber. FIG. 2, described in detail below, illustrates an example slot namespace for an optical fiber.

Figure 3:
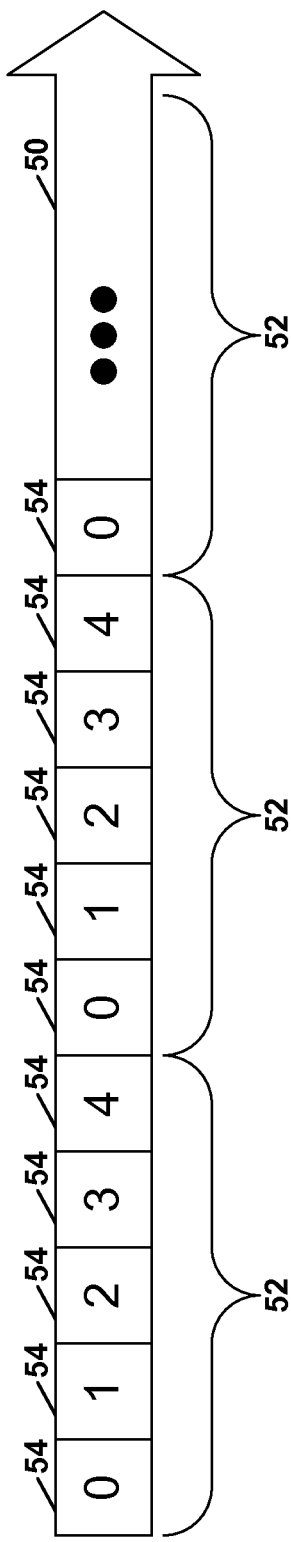
FIG. 3 is a conceptual diagram that illustrates an example timeline divided into a series of time periods that are divided into time slots.

In some examples, optical network system 2 uses time division multiplexing. In such examples, the physical slots of an optical fiber are time slots. In such examples, time is divided into a series of time periods of equal duration. Each of these time periods is further divided into time slots of equal duration. In examples where optical network system 2 uses time division multiplexing, a data unit may correspond to the data received by an optical network device from an optical fiber during a given time slot. FIG. 3, described in detail below, illustrates an example timeline divided into a series of time periods that are further divided into time slots.

In other examples, optical network system 2 uses wavelength division multiplexing. In such examples, the physical slots of an optical fiber are wavelength slots. In such examples, a wavelength spectrum is divided into a series of wavelengths. Different paths may be assigned to different wavelengths. In examples where optical network system 2 uses wavelength division multiplexing, a data unit may correspond to the data received on a given optical fiber by an optical network device on a given wavelength during a given period of time. This disclosure may refer to time slots and wavelength slots generically as "slots."

The virtual slots of an optical fiber are not time slots or wavelengths slots. For example, if optical network system 2 uses wavelength division multiplexing, there may be no wavelength that directly corresponds to a virtual slot. Rather, the virtual slots may serve as a mechanism for pre-registering virtual labels on a physical slot without actually reserving the physical slot.

In the example of FIG. 1, a primary path 10 extends through optical network devices 4A and 4B. A backup path 12 extends from optical network device 4A to optical network device 4B through optical network device 4B. An additional path 14 extends through network devices 4D, 4C, and 4B. Backup path 12 is a backup path to primary path 10. A first path may be a backup path to a second path when traffic associated with the second path is rerouted onto the first path in response to a segment of the second path becoming non-operational.

Each of optical network devices 4 may store routing data. The routing data stored by an optical network device may indicate upstream and downstream ports for paths that pass through the optical network device. An upstream port of a path may be the port of an optical network device at which the optical network device receives data units associated with the path. In this disclosure, an optical fiber connected to a path's upstream port may be referred to as the path's upstream optical fiber. A downstream port of a path may be a port of an optical network device on which the optical network device forwards data units associated with the path. In this disclosure, an optical fiber connected to a path's downstream port may be referred to as the path's downstream optical fiber. For example, the routing data stored by optical network device 4C may indicate port 6G as the upstream port for backup path 12 and may indicate port 6H as a downstream port of backup path 12. In this example, Furthermore, the routing data stored by optical network device 4C may indicate port 6I as the upstream port for path 14 and may indicate port 6H as a downstream port of path 14.

Optical network devices along a path (e.g., primary path 10, backup path 12, path 14, etc.) may perform a slot reservation operation for the path. When the optical network devices along a path perform a slot reservation operation for the path, the optical network devices may reserve slots of the optical fibers along the path to use for forwarding data units associated with the path. As described in detail below, if the path is a backup path, the optical network devices may reserve virtual slots for the path. Reserving virtual slots for a path does not reserve the corresponding physical slots, and the bandwidth associated with the corresponding physical slots, for the path. Because reserving a virtual slot for a backup path does not reserve the corresponding physical slot for the backup path, the virtual slots reserved for several backup paths may correspond to the same physical slot. If the path is a primary path, the optical network devices may reserve physical slots for the path. Reserving physical slots for a path may reserve bandwidth for the path.

Furthermore, when the optical network devices along a path perform a slot reservation operation for the path, the optical network devices select one or more flow identifiers. A flow identifier may be a set of data specified in a data unit. The optical network devices may select the flow identifiers such that data units associated with different paths that enter an optical network device on the same physical slot of the same port do not have the same flow identifier. In this way, an optical network device may determine, based on the flow identifiers specified by data units received on a given slot of an optical fiber, which paths are associated with the data units.

In this disclosure, flow identifiers may alternately be referred to as "flow labels." In some examples, flow identifiers may be character strings or numbers.

Various portions of the data units may contain flow identifiers. For example, the flow identifier may be coded into the overhead of a data unit. In this example, a trail trace identifier field of a data unit may specify the flow identifier.

To perform a slot reservation operation for a path, an ingress network device of the path may send a so-called "path" message to a downstream network device on the path. If the downstream network device is not the egress network device of the path, the downstream network device may send a path message to an optical network device that is further downstream on the path. If the optical network device that is further downstream on the path is not the egress network device of the path, this optical network device may send another path message to an optical network device that is yet further downstream on the path. This may continue until the egress network device of the path receives the path message.

For example, optical network device 4A is the ingress network device of backup path 12 and optical network device 4B is the egress network device of backup path 12. Accordingly, optical network device 4A may send a path message 15 to optical network device 4C. Because optical network device 4C is not the egress network device of backup path 12, optical network device 4C may send a path message 16 to optical network device 4B. In the example of FIG. 1, optical network devices 4A and 4B are not the ingress network devices or egress network devices of primary path 10. However, optical network device 4A may receive a path message from an upstream network device on primary path 10. In response, optical network device 4A may send a path message 18 to optical network device 4B.

When an egress network device of a path receives a path message associated with the path, the egress network device may select a slot of the optical fiber that connects the egress network device to an upstream network device on the path. In other words, the egress network device may select a slot of the path's upstream optical fiber. If the path is a backup path, the egress network device may select a virtual slot. If the path is a primary path, the egress network device may select a physical slot. The optical network device does not select the same slot of the path's upstream optical fiber for more than one path. The egress network device may also select a flow identifier. After selecting the slot and the flow identifier, the egress network device may send a so-called "reservation" message to an upstream network device on the path. The reservation message may indicate the selected flow identifier and may indicate that the egress network device has reserved the selected slot for the path.

For example, optical network device 4B is the egress network device of backup path 12. When optical network device 4B receives a path message associated with backup path 12 (e.g., path message 16), optical network device 4B may select a flow identifier and may select a virtual slot of optical fiber 8C. Optical network device 4B may then send a reservation message 20 to optical network device 4C (i.e., the upstream network device on backup path 12). Reservation message 20 may indicate the selected flow identifier and may indicate that optical network device 4B has reserved the selected virtual slot of optical fiber 8C for backup path 12.

When an optical network device receives a reservation message associated with a path, the optical network device may perform different actions depending on whether or not the optical network device is the ingress network device of the path. If the optical network device is not the ingress network device of the path, the optical network device may store data that indicate the flow identifier specified by the reservation message and may store data that indicate the slot reserved by the downstream network device for the path. In addition, the optical network device may select a slot of the optical fiber that connects the optical network device to an optical network device that is further upstream on the path. In other words, the optical network device may select a slot of the path's upstream optical fiber. If the path is a primary path, the optical network device may select a physical slot of the path's upstream optical fiber. If the path is a backup path, the optical network device may select a virtual slot. The optical network device does not select the same slot of the path's upstream optical fiber for more than one path. The optical network device may then send a reservation message to an optical network device that is further upstream on the path. The reservation message may indicate the selected flow identifier and may indicate that the optical network device has reserved the selected slot for the path.

In the example of FIG. 1, optical network device 4C is not the ingress network device of backup path 12. Accordingly, when optical network device 4C receives reservation message 20, optical network device 4C may store data that indicate the flow identifier specified by reservation message 20 and may store data that indicate the slot of optical fiber 8C reserved for backup path 12. In addition, optical network device 4C may select a flow identifier and may select a virtual slot of optical fiber 8B. Optical network device 4C selects a virtual slot of optical fiber 8B because backup path 12 is a backup path as opposed to a primary path. After selecting the flow identifier and the virtual slot, optical network device 4C may send a reservation message 22 to optical network device 4A (i.e., the optical network device that is upstream on backup path 12 from optical network device 4C). Reservation message 22 may indicate the selected flow identifier and may indicate that optical network device 4C has reserved the selected virtual slot of optical fiber 8B for backup path 12.

Furthermore, in the example of FIG. 1, optical network device 4B is not the ingress network device of primary path 10. Accordingly, when optical network device 4B receives a reservation message from an optical network device further downstream on primary path 10, optical network device 4B may select a flow identifier and a physical slot of optical fiber 8A. Optical network device 4B selects a physical slot of optical fiber 8A because primary path 10 is a primary path and not a backup path. After selecting the flow identifier and the physical slot, optical network device 4B may send a reservation message 24 to optical network device 4A (i.e., the optical network device that is upstream on primary path 10 from optical network device 4B). Reservation message 24 may indicate the selected flow identifier and may indicate that optical network device 4B has reserved the selected physical slot of optical fiber 8A for primary path 10.

If an optical network device is the ingress network device of a path and the optical network device receives a reservation message associated with the path, the optical network device may store data that indicate the flow identifier specified by the reservation message and may store data that indicate the slot reserved for the path. As described below, the optical network device may use such data to determine how to forward data units associated with the path. If the path is a backup path, the optical network device may use data indicated by the reservation message to re-route data units associated with the corresponding primary path to the backup path.

When any of optical network devices 4 receives a data unit on a physical slot of an optical fiber connected to a given port of the optical network device, the optical network device may determine, based on the data unit being received by the optical network device on the physical slot of the optical network device and based on a flow identifier specified by the data unit, that the data unit is associated with a particular path. After identifying the path, the optical network device may determine whether a downstream segment of the path is operational. The downstream segment of the path may be a segment of the path that is downstream on the path from the optical network device. A segment of a path may include one or more consecutively connected optical devices and optical fibers.

A segment of a path may become non-operational for a variety of reasons. For example, a segment of a path may be non-operational if an optical fiber in the segment of the path is unable to transmit light from a first device to a second device. In this example, an optical fiber may be unable to transmit light from a first device to a second device if the optical fiber is cut or breaks. In another example, a downstream segment of a path may become non-operational if an optical fiber in the downstream segment of the path becomes detached from a port. In another example, a segment of a path may become non-operational if an optical network device or other device in the segment goes offline.

If the downstream segment of the path is operational, the optical network device may determine whether a physical slot or a virtual slot of the path's downstream optical fiber has been reserved for the path. A physical slot of the path's downstream optical fiber may be reserved for the path if the path is a primary path. If a physical slot of the path's downstream optical fiber has been reserved for the path, the optical network device forwards the data unit on the physical slot of the path's downstream optical fiber.

A virtual slot of the path's downstream optical fiber may be reserved for the path if the path is a backup path. If a virtual slot of the path's downstream optical fiber has been reserved for the path, the optical network device may identify a physical slot that corresponds to the virtual slot. In other words, the optical network device may identify, based on the virtual slot, a physical slot of the path's downstream optical fiber. The optical network device may forward the data unit on the identified physical slot of the path's downstream optical fiber.

However, if a downstream segment of the path is not operational, it may be desirable to quickly re-route the traffic associated with the path to a backup path so that the traffic arrives at its destination without significant delay. Such fast re-routing may be valuable in applications such as Voice over Internet Protocol (VoIP) and video conferencing that depend on a consistent stream of data units being delivered in real time.

Accordingly, the optical network device may identify a virtual slot of a backup path's downstream optical fiber. In other words, the optical network device may identify a virtual slot of a second optical fiber that is connected to the optical network device, where the virtual slot of the second optical fiber is reserved for the backup path. The optical network device may then identify, based on the virtual slot of the backup path's downstream optical fiber, a physical slot of the backup path's downstream optical fiber. The optical network device may then forward data units on the identified physical slot of the backup path's downstream optical fiber. In this way, the optical network device may re-route the data units onto the backup path.

In this way, the optical network device may receive traffic on a physical slot of a first port of a first optical fiber. The first optical fiber may be connected to a first port of the optical network device. The traffic may include a given data unit. Furthermore, the optical network device may determine, based on the given data unit being received by the optical network device on the physical slot of the first optical fiber and based on a flow identifier specified by the given data unit, that the given data unit is associated with a first path. The optical network device may determine whether a downstream segment of the first path is operational. In response to determining that the downstream segment of the first path is not operational, the optical network device may identify a virtual slot of a second optical fiber that is connected to the optical network device. The virtual slot of the second optical fiber may be reserved for a second path. The optical network device may also identify, based on the virtual slot of the second optical fiber, a physical slot of the second optical fiber. The optical network device may forward the given data unit on the physical slot of the second optical fiber.

FIG. 2 is a conceptual diagram that illustrates an example slot namespace 30. In the example of FIG. 2, slot namespace 30 includes slot identifiers ranging from 0 to n. Slot namespace 30 is partitioned into a physical slot namespace 32 and a virtual slot namespace 34. Each slot identifier in physical slot namespace 32 may identify a physical slot of an optical fiber. Reservation of a physical slot of the optical fiber for a path may reserve a portion of the bandwidth of the optical fiber for the path. Each slot identifier in virtual slot namespace 34 may identify a virtual slot of the optical fiber. In contrast to reservation of a physical slot for a path, reservation of a virtual slot of the optical fiber for a path does not reserve a portion of the bandwidth of the optical fiber for the path.

Physical slot namespace 32 and virtual slot namespace 34 do not overlap. In other words, no slot identifier is in both physical slot namespace 32 and virtual slot namespace 34. In the example of FIG. 2, physical slot namespace 32 includes slot identifiers 0 through 99 and virtual slot namespace includes slot identifiers 100 through n. In other examples, slot namespace 30 may be partitioned differently. For example, the physical slot namespace may include the slot identifiers at an upper end of the slot namespace and the virtual slot namespace may include the slot identifiers at a lower end of the slot namespace. For instance, in this example, the physical slot namespace may include slot identifiers 100 through n and the virtual slot namespace may include slot identifiers 0 through 99. In another example, the physical slot namespace may include more or less than one hundred slot identifiers.

There may be a pre-defined relationship between virtual slot identifiers and corresponding physical slot identifiers. Hence, there may be a pre-defined relationship between virtual slots of an optical fiber and physical slots of the optical fiber. For example, a relationship between virtual slot identifiers and physical slot identifiers may be pre-defined such that a virtual slot identifier modulo n is equal to the corresponding physical slot identifier. In this example, the modulus n may be equal to the number of physical slot identifiers. For instance, in the example of FIG. 2, there are one hundred physical slot identifiers. Hence, the virtual slot identifier "120" may correspond to the physical slot identifier "20" because 120 modulo 100 is equal to 20. Hence, if a downstream network device has reserved a virtual slot having virtual slot identifier "120" for a given path, the downstream network device may receive data units associated with the given path on the physical slot identified by the physical slot identifier "20."

FIG. 3 is a conceptual diagram that illustrates an example timeline 50 divided into a series of time periods 52 which are divided into time slots 54. Each of time periods 52 may correspond to an equal amount of time. Furthermore, each of time slots 54 may correspond to an equal amount of time. Each of time slots 54 is associated with a slot identifier that recurs on a periodic basis, e.g., once per time period. In the example of FIG. 3, time slots 54 are associated with slot identifiers 0 through 4. In other examples, time slots may be associated with more or fewer time slot identifiers. For instance, time slots may be associated with slot identifiers 0 through 99. The time slots of an optical fiber that have the same identifier may be assigned to the same path. For example, the time slots "0" of a given optical fiber may be associated with a first path, the time slots "1" of the given optical fiber may be associated with a second path, and so on.

Figure 4:
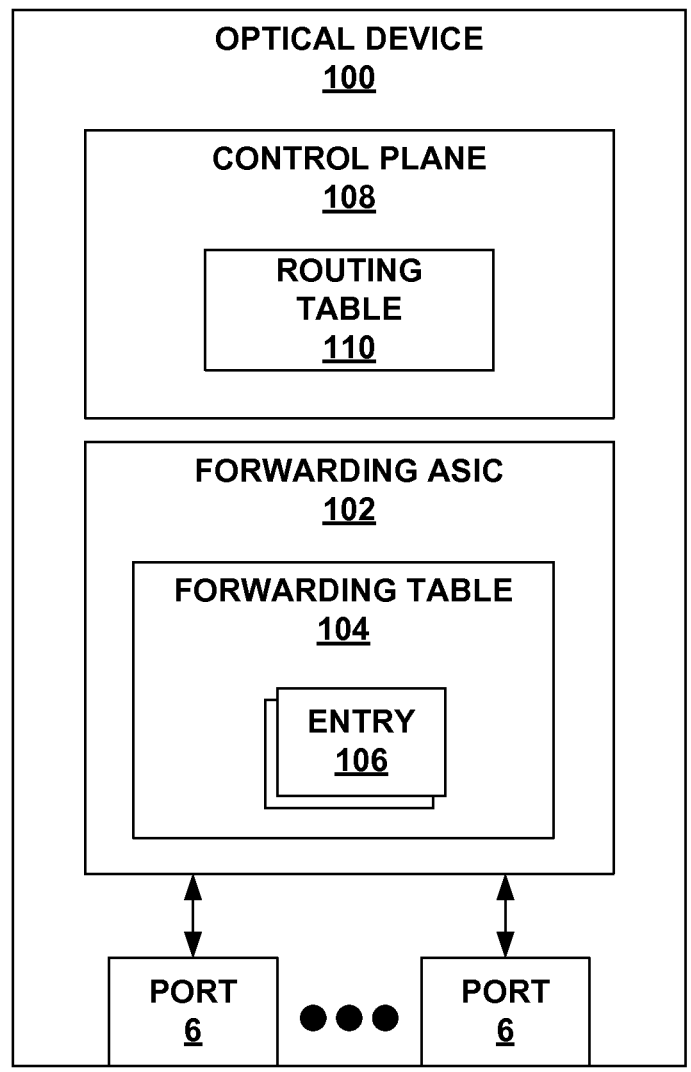
FIG. 4 is a block diagram that illustrates an example configuration of an optical network device.

FIG. 4 is a block diagram that illustrates an example configuration of an optical network device 100. In some examples, optical network devices 4 (FIG. 1) are implemented using the configuration of optical network device 100. In the example of FIG. 4, optical network device 100 comprises ports 6, a forwarding ASIC 102, and a control plane 108. In some instances, forwarding ASIC 102 be implemented using a field programmable gate array (FPGA). In other examples, forwarding ASIC 102 may be implemented using other types of ASICs. Ports 6 may be associated with one or more line cards (not shown).

Forwarding ASIC 102 may store a forwarding table 104. Forwarding table 104 contains one or more computer-readable storage media that store entries 106. Control plane 108 may include one or more computer-readable storage media that store a routing table 110. Forwarding ASIC 102 may implement a state machine that allows forwarding ASIC 102 to read label information from the received data unit and create a cross-connection based on forwarding table 104. The label information of a data unit may include information indicating the slot and port on which optical network device 4A received the data unit and the flow identifier specified by the data unit. In some instances, the state machine may determine how to forward the data unit in less than 10 milliseconds.

Routing table 110 may store routing data as a plurality of entries. Each of the entries in routing table 110 may indicate a destination address and a next hop address. In some examples, the destination address and the next hop address may be Internet Protocol (IP) addresses. Each of the entries in routing table 110 may specify a different destination address. However, different entries in routing table 110 may specify the same next hop address.

Optical network device 100 may exchange routing messages with other optical network devices, e.g., optical network devices 4A-4D. Control plane 108 may generate entries in routing table 110 based on such routing messages. In some instances, the routing messages may instruct optical network device 100 to forward packets that specify particular destination addresses along specific paths. For example, a network administrator may determine that data units destined for a particular network address should be forwarded along a given path. In this example, optical network device 100 may receive a routing message that instructs optical network device 100 to forward data units destined for the particular network address to an optical network device that is downstream from optical network device 100 on the given path. In this example, optical network device 100 may generate an entry in routing table 110 that indicates the particular network address as the destination address and indicates a network address of the downstream optical network device as the next hop address.

Figure 5:
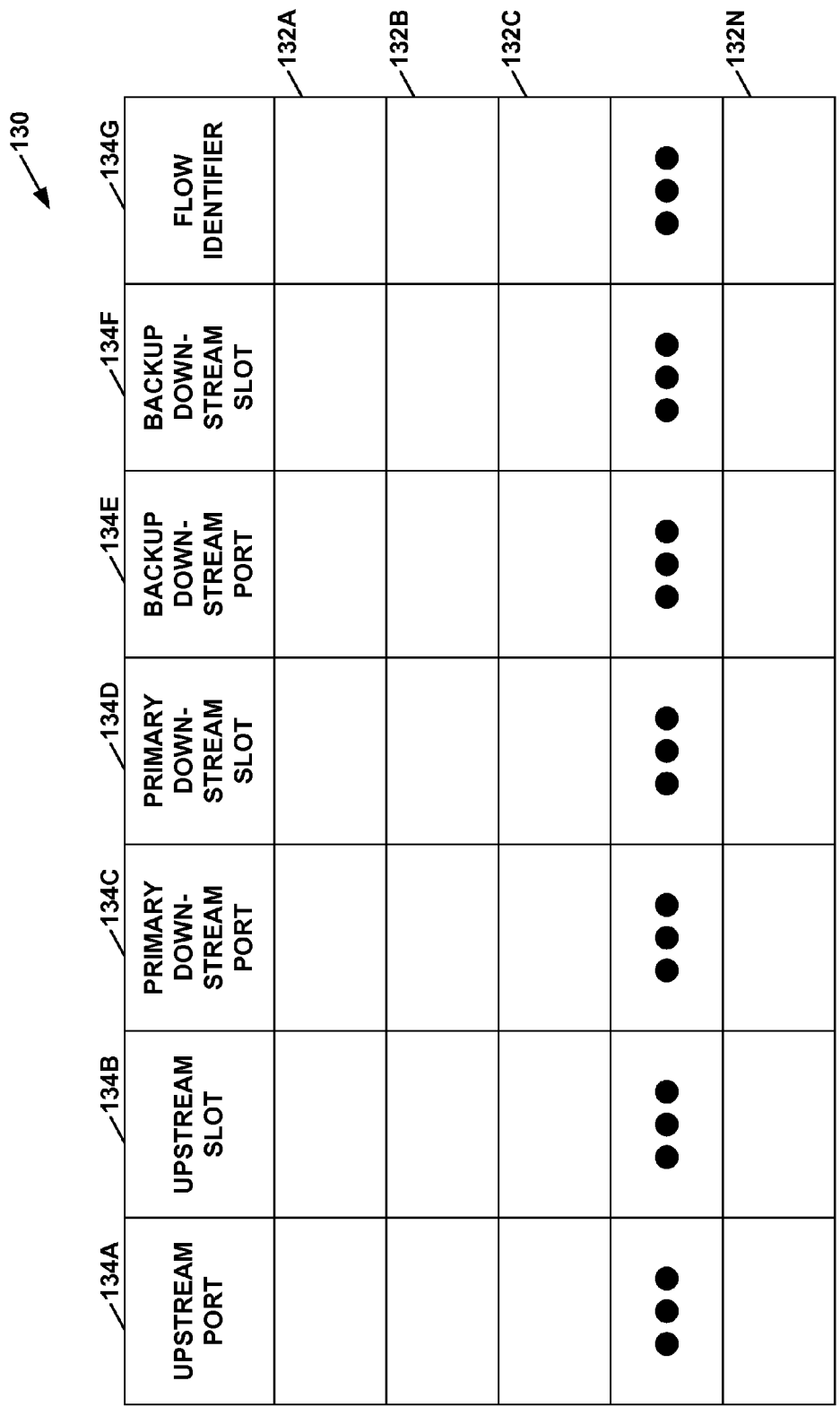
FIG. 5 is a conceptual diagram that illustrates an example forwarding table.

As illustrated in the example of FIG. 4, forwarding table 104 includes a plurality of entries 106. FIG. 5, described in detail below, illustrates an example forwarding table. Each of entries 106 is associated with a path. Each of entries 106 may be a forwarding rule for the path associated with the entry. Control plane 108 may generate and/or modify data in entries 106 based at least in part on routing table 110.

Each of entries 106 may specify an upstream port of the path associated with the entry and a primary downstream port of the path associated with the entry. The entry may specify the upstream port of the path and the primary downstream port of the path in various ways. For example, each of ports 6 may be associated with a unique identifier, such as a number or string. In this example, an entry may specify a port by specifying the unique identifier associated with the port.

If optical network device 100 is the egress network device of a path, optical network device 100 may select a flow identifier and a slot for the path. If the path is a primary path, optical network device 100 may select a physical slot. If the path is a backup path, optical network device 100 may select a virtual slot and then identify a physical slot that corresponds to the selected virtual slot. After selecting the flow identifier and the slot, optical network device 100 may modify the entry in forwarding table 104 associated with the path to specify the selected flow identifier as the path's upstream flow identifier and to specify the selected or identified physical slot as the path's upstream slot. The path's upstream slot may be the slot on which an optical network device receives data units associated with the path. Optical network device 100 may send to an upstream network device a reservation message to indicate the selected flow identifier and to indicate that optical network device 100 has reserved the selected slot of the path's upstream optical fiber for the path.

If optical network device 100 is not the egress network device of a path and is not the ingress network device of the path, optical network device 100 may receive a reservation message associated with the path. The reservation message may indicate a flow identifier and may indicate that a downstream network device has reserved a slot of the path's downstream optical fiber for the path. In response to receiving the reservation message, optical network device 100 may modify the entry in forwarding table 104 associated with the path such that the entry specifies the flow identifier indicated by the reservation message as the path's downstream flow identifier. In addition, optical network device 100 may modify the entry such that the entry specifies the slot specified by the reservation message as the path's primary downstream slot.

Furthermore, if optical network device 100 is not the egress network device of a path and is not the ingress network device of the path, optical network device 100 may select a flow identifier and a slot of the path's upstream optical fiber. If the path is a primary path, optical network device 100 may select a physical slot of the path's upstream optical fiber. If the path is a backup path, optical network device 100 may select a virtual slot and may identify a physical slot that corresponds to the selected virtual slot. Optical network device 100 may modify the entry in forwarding table 104 associated with the path such that the entry specifies the selected flow identifier as the path's upstream flow identifier. In addition, optical network device 100 may modify the entry such that the entry specifies the selected or identified physical slot as the path's upstream slot. Optical network device 100 may send a reservation message to an optical network device that is further upstream on the path. This reservation message may indicate the selected flow identifier and may indicate that optical network device 100 has reserved the selected slot of the path's upstream optical fiber for the path.

If optical network device 100 is the ingress network device of a path, optical network device 100 may receive a reservation message associated with the path. The reservation message may indicate a flow identifier and may indicate that a downstream network device has reserved a slot of the path's downstream optical fiber for the path. In response to receiving the reservation message, optical network device 100 may determine whether the path is a primary path or a backup path. If the path is a primary path, optical network device 100 may modify the entry in forwarding table 104 associated with the path such that the entry specifies the flow identifier indicated by the reservation message as the path's primary downstream flow identifier. Furthermore, if the path is a primary path, optical network device 100 may modify the path's entry in forwarding table 104 such that the path's entry specifies the slot indicated by the reservation message as the path's primary downstream slot.

On the other hand, if the path is a backup path, optical network device 100 may identify an entry in forwarding table 104 associated with a primary path that corresponds to the backup path. Optical network device 100 may modify the corresponding primary path's entry in forwarding table 104 such that the entry specifies the flow identifier indicated by the reservation message as the corresponding primary path's backup downstream flow identifier. In addition, optical network device 100 may modify the corresponding primary path's entry such that the entry specifies the slot indicated by the reservation message as the corresponding primary path's backup downstream slot.

When one of ports 6 receives a data unit in a given physical slot of an optical fiber connected to a given port, forwarding ASIC 102 may identify, based on the data unit being received on the given physical slot of the optical fiber and based on a flow identifier specified by the data unit, an entry in forwarding table 104 that is associated with a path. For ease of explanation, this disclosure may refer to the identified entry as the "relevant entry." To identify the relevant entry, forwarding ASIC 102 may first identify entries that specify the given port as the upstream port and that specify the given slot as the upstream slot.

For various reasons, there may be multiple entries in forwarding table 104 that specify the given port as the upstream port and that specify the given slot as the upstream slot. For example, multiple virtual slots of the optical fiber may correspond to the same physical slot of the optical fiber. In this example, if two or more of these virtual slots are reserved for different backup paths, there may be more than one entry that specifies the given port as the upstream port and that specifies the given slot as the upstream slot. In another example, a virtual slot of the optical fiber may correspond to a physical slot of the optical fiber. In this example, the virtual slot may be reserved for a backup path and the physical slot may be reserved for a primary path.

If there are multiple entries that specify the given port as the upstream port and that specify the given slot as the upstream slot, forwarding ASIC 102 may identify the relevant entry from among these entries by determining which one of these entries indicates an upstream flow identifier that matches the flow identifier specified by the data unit.

Forwarding ASIC 102 may determine whether a downstream segment of a path associated with the relevant entry is operational. In various examples, forwarding ASIC 102 may determine whether the downstream segment of the path is operational in various ways. For example, forwarding ASIC 102 may determine whether the downstream segment of the path is operational at least in part by determining whether a timeout period has elapsed after optical network device 100 last received a "heartbeat" signal from the path's downstream optical fiber. In another example, forwarding ASIC 102 may determine whether the downstream segment of the path is operational at least in part by determining whether optical network device 100 received an acknowledgment of data sent on the path.

In response to determining that the downstream segment of the path is operational, forwarding ASIC 102 may determine whether the primary downstream slot indicated by the relevant entry is a physical slot or a virtual slot. If the primary downstream slot is a physical slot, forwarding ASIC 102 may forward the data unit on the indicated primary downstream slot of the optical fiber that is connected to the indicated primary downstream port. If the indicated primary downstream slot is a virtual slot, forwarding ASIC 102 may identify a physical slot that corresponds to the virtual slot and forward the data unit on the identified physical slot of the optical fiber that is connected to the indicated primary downstream port. When forwarding ASIC 102 forwards the data unit, forwarding ASIC 102 may modify the data unit such that the data unit specifies the downstream flow identifier specified by the relevant entry.

On the other hand, in response to determining that the downstream segment of the path is not operational, forwarding ASIC 102 identifies a physical slot that corresponds to the virtual slot indicated by the relevant entry as the backup downstream slot. After identifying the physical slot, forwarding ASIC 102 forwards the data unit on the identified physical slot of the optical fiber that is connected to the port indicated by the relevant entry as the backup downstream port. When forwarding ASIC 102 forwards the data unit, forwarding ASIC 102 may modify the data unit such that the data unit specifies the downstream flow identifier specified by the relevant entry.

FIG. 5 is a conceptual diagram that illustrates an example configuration of forwarding table 130. Forwarding table 104 (FIG. 4) may be implemented in a manner similar to forwarding table 130. As illustrated in the example of FIG. 5, forwarding table 130 includes a plurality of entries 132A through 132N (collectively, "entries 132"). Each of entries 132 corresponds to a row in forwarding table 130. Each of entries 132 may be associated with a different path. For instance, in the example of FIG. 1, if optical network device 4C stores forwarding table 130, one of entries 132 may be associated with backup path 12 and another one of entries 132 may be associated with path 14.

In addition, forwarding table 130 includes a plurality of columns 134A through 134G (collectively, "columns 134"). Cells in column 134A store upstream port identifiers for different paths. The upstream port identifier of an entry associated with a given path may identify an upstream port of the given path. Cells in column 134B store upstream slot identifiers for different paths. The upstream slot identifier of an entry associated with a given path may identify an upstream slot of the given path. Cells in column 134C store primary downstream port identifiers for different paths. A primary downstream port identifier of an entry associated with a given path may identify a port of an optical network device that is connected to the given path's upstream optical fiber. Cells in column 134D store primary downstream slot identifiers for different paths. The primary downstream slot identifier of an entry associated with a given path may identify a primary downstream slot for the given path. Cells in column 134E store backup downstream port identifiers for different paths. A backup downstream port identifier of an entry associated with a given path may identify a port that is connected to the given path's backup downstream optical fiber. A path's backup downstream optical fiber is an optical fiber connected to the path's backup downstream port. Cells in column 134F store backup downstream slot identifiers for different paths. A backup downstream slot identifier of an entry that is associated with a given path may identify a slot of the given path's backup downstream optical fiber. Cells in column 134G store flow identifiers for different paths.

As discussed above, optical network devices may select flow identifiers in response to receiving reservation messages. In some examples, the optical network devices may always select the same flow identifiers as the flow identifiers specified by the reservation messages. Furthermore, an egress network device of a backup path may select a flow identifier that matches the flow identifier used in the corresponding primary path. Consequently, in the forwarding tables of the optical network devices, the upstream flow identifiers may always match the downstream flow identifiers. Accordingly, in such examples, it may be unnecessary for the forwarding tables to include separate columns for the upstream flow identifier and the downstream flow identifier. Rather, in examples such that of FIG. 5, the forwarding tables may include a single flow identifier column.

Figure 6:
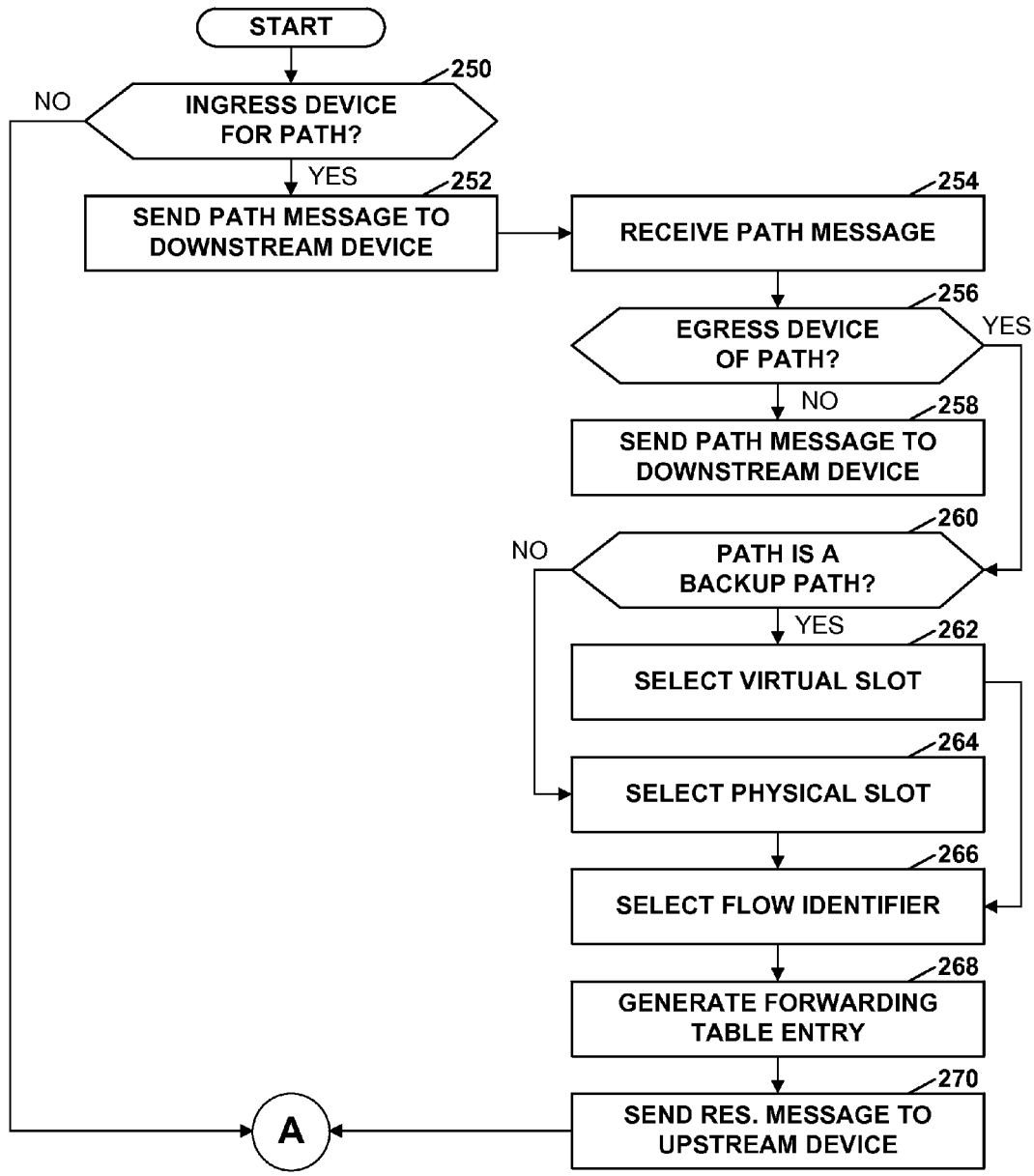
FIG. 6 is a flowchart that illustrates example operations of an upstream network device and a downstream network device of a path.

FIG. 6 is a flowchart that illustrates example operations of an upstream network device and a downstream network device of a path. In some instances, the upstream network device and the downstream network device may correspond to different ones of optical network devices 4 (FIG. 1). For example, the upstream network device may be optical network device 4A and the downstream network device may be optical network device 4B or optical network device 4C. In another example, the upstream network device may be optical network device 4C and the downstream network device may be optical network device 4B. In yet another example, the upstream network device may be optical network device 4D and the downstream network device may be optical network device 4C.

As illustrated in the example of FIG. 6, the upstream network device determines whether the upstream network device is an ingress network device for the path (250). The upstream network device may determine whether the upstream network device is the ingress network device for the path in various ways. For example, the routing data stored in the upstream network device may indicate whether the upstream network device is the ingress network device for the path.

Figure 7:
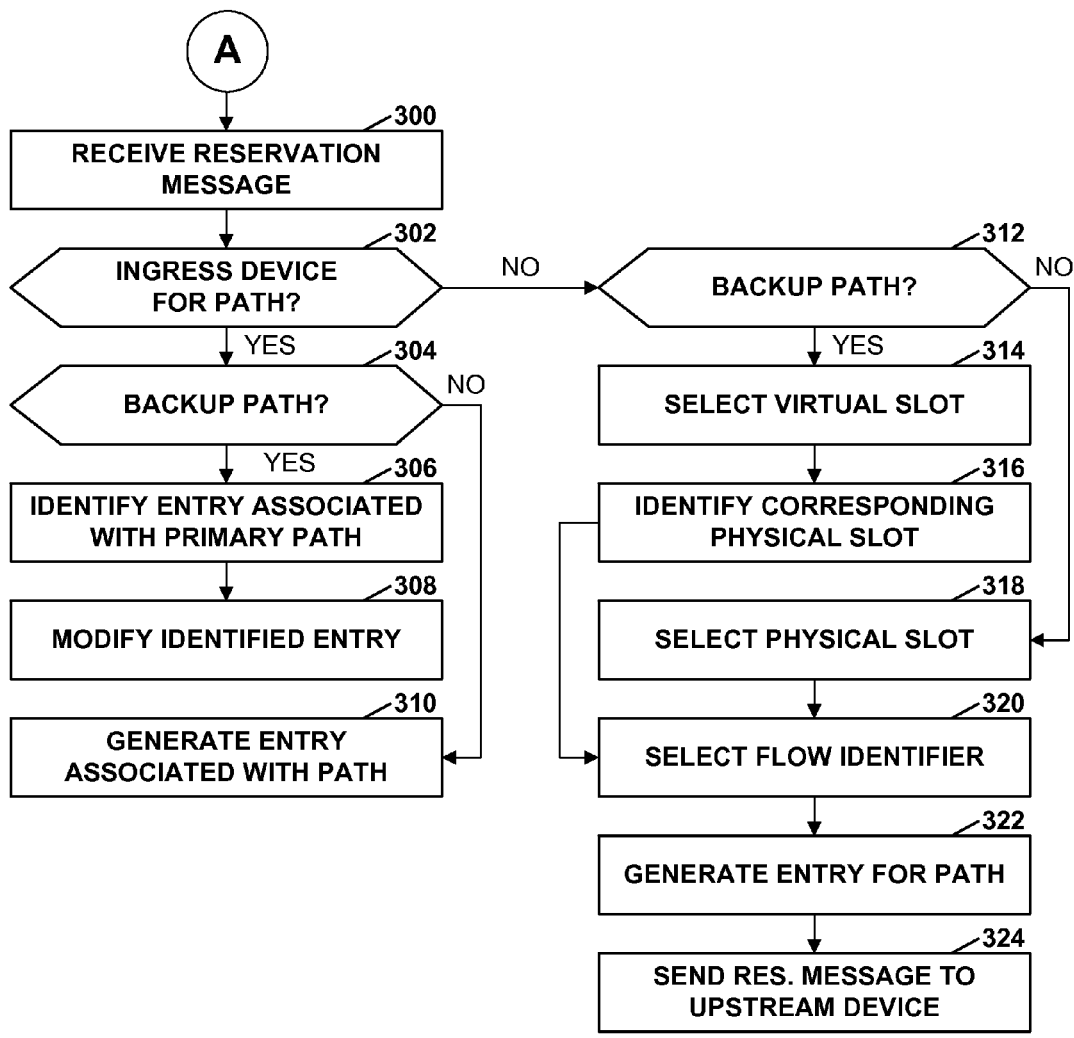
FIG. 7 is a flowchart that illustrates an example operation performed by the upstream network device in response to receiving a reservation message associated with a path.

If the upstream network device is not the ingress network device for the path ("NO" of 250), the upstream network device may perform the operations shown in the example of FIG. 7. Otherwise, if the upstream network device is the ingress network device for the path ("YES" of 250), the upstream network device may send a path message to a downstream network device (252). The downstream network device may be the optical network device that follows the upstream network device on the path. For example, if the upstream network device is optical network device 4A and the path is primary path 10, the downstream network device may be optical network device 4B. If the upstream network device is optical network device 4A and the path is backup path 12, the downstream network device may be optical network device 4C.

The upstream network device may send the path message to the downstream network device in various ways. For example, the upstream network device may send the path message on an optical fiber that connects the upstream network device to the downstream network device. In this example, the upstream network device may use a slot of the optical fiber that is associated with control plane traffic to send the path message to the downstream network device. In another example, a separate data communication network may connect the upstream network device and the downstream network device. In this example, the upstream network device may send the path message to the downstream network device via the separate data communication network.

After the upstream network device sends the path message to the downstream network device, the downstream network device receives the path message (254). After the downstream network device receives the path message, the downstream network device may determine whether the downstream network device is the egress network device of the path (256). For example, if the downstream network device is optical network device 4B and the path is backup path 12, the downstream network device may determine that the downstream network device is the egress network device of backup path 12. In another example, if the downstream network device is optical network device 4C and the path is backup path 12 or path 14, the downstream network device may determine that the downstream network device is not the egress network device of the path.

In response to determining that the downstream network device is not the egress network device of the path ("NO" of 256), the downstream network device may send a path message to an optical network device that is further downstream on the path (258). For example, if the downstream network device is optical network device 4C and the path is either backup path 12 or path 14, the downstream network device may send the path message to optical network device 4B. For ease of explanation, this disclosure may refer to the path message received by the downstream network device as the first path message and may refer to the path message sent by the downstream network device as the second path message. The optical network device that is further downstream on the path may perform an operation similar to the downstream network device in response to receiving the second path message.

The second path message may include various data. For example, the second path message may include data that identify the path. In another example, the second path message may include data, such as an address, associated with an egress network device of the path. In some example, the second path message may include identifiers of each upstream optical network device on the path.

However, in response to determining that the downstream network device is the egress network device of the path ("YES" of 256), the downstream network device may determine whether the path is a backup path (260). In some examples, the downstream network device may determine whether the path is a backup path based on data specified by the first path message.

In response to determining that the path is a backup path ("YES" of 260), the downstream network device may select a virtual slot of the optical fiber connected to the path's upstream port (262). In other words, the downstream network device may select a virtual slot of the path's upstream optical fiber. The downstream network device may select a virtual slot of the path's upstream optical fiber in various ways. For example, the downstream network device may select the virtual slot such that reserved virtual slots are distributed widely over corresponding physical slots of the path's upstream optical fiber. This may reduce the risk of the downstream network device using a particular physical slot of the path's upstream optical fiber to transmit traffic associated with the backup paths of multiple paths. In some examples, the downstream network device may select a virtual slot that corresponds to a reserved physical slot of the path's upstream optical fiber only if all of the physical slots of the path's upstream optical fiber are reserved.

Otherwise, in response to determining that the path is not a backup path ("NO" of 260), the downstream network device may select a physical slot of the optical fiber connected to the path's upstream port (264). In other words, the downstream network device may select a physical slot of the path's upstream optical fiber. In various examples, the downstream network device may select the physical slot of the path's upstream optical fiber in various ways. For example, the downstream network device may scan through the physical slots of the path's upstream optical fiber and reserve the first unreserved physical slot of the path's upstream optical fiber. In another example, the downstream network device may attempt to spread the reserved slots evenly across the range of physical slots of the path's upstream optical fiber. In some examples, the downstream network device may use a set of flags or one or more other data structures to indicate which physical slots of the path's upstream optical fiber have already been reserved.

Furthermore, in response to determining that the downstream network device is the egress network device of the path, the downstream network device selects a flow identifier (266). The downstream network device may select the flow identifier in various ways. For example, the downstream network device may select the flow identifier based on the path's upstream port and the selected virtual or physical slot. For instance, the downstream network device may select the flow identifier by generating a character string that includes an identifier of the path's upstream port and an identifier of the selected virtual or physical slot. In some examples, the flow identifier may indicate an address of an ingress network device of the path, an address of an egress network device of the path, and/or one or more additional units of data.

In another example of how the downstream network device may select the flow identifier, the downstream network device may determine whether the path is a backup path or a primary path. In this example, if the path is a backup path, the downstream network device may determine whether a forwarding table entry of the downstream network device indicates a path identifier for the corresponding primary path. If so, the downstream network device may select the flow identifier for the backup path based on the flow identifier for the corresponding primary path. For instance, the downstream network device may select the flow identifier of the backup path such that the flow identifier of the backup path matches the flow identifier of the primary path.

After selecting a slot in steps 262 or 264 and after selecting a flow identifier in step 266, the downstream network device may generate or modify, in the forwarding table of the downstream network device, an entry associated with the path (268). In the example of FIG. 4, if the downstream network device is optical network device 100, the downstream network device may generate or modify, in forwarding table 104, an entry 106 associated with the path.

The entry may include the selected flow identifier as the path's upstream flow identifier. In addition, the entry may include an upstream port identifier that specifies the path's upstream port. In addition, the entry may include an upstream slot identifier. If the path is a primary path, the upstream slot identifier specifies the selected physical slot. If the path is a backup path, the downstream network device may select a virtual slot for the path and then identify a physical slot that corresponds to the selected virtual slot. The downstream network device may generate the entry such that the upstream slot identifier specifies the identified physical slot.

Furthermore, if the path is a backup path, the downstream network device may identify a primary downstream port and a primary downstream slot of the corresponding primary path. The downstream network device may generate or modify the entry associated with the backup path such that the primary path identifier of the entry identifies the primary downstream port of the primary path and such that the primary downstream slot identifier of the entry identifies the primary downstream slot of the primary path. Consequently, the downstream network device may route traffic associated with the backup path back onto the primary path. If the path is a primary path, the downstream network device may use the stored routing data to generate or modify the entry to indicate how the downstream network device is to forward traffic associated with the path.

Furthermore, after selecting the slot in steps 262 or 264 and after selecting the flow identifier in step 266, the downstream network device may send a reservation ("res.") message to the upstream network device (270). The reservation message may specify the selected flow identifier. The reservation message may also specify that the downstream network device has reserved the selected slot for the path. Furthermore, the reservation message may include data that identify the path.

The downstream network device may send the reservation message to the upstream network device in various ways. For example, the downstream network device may send the reservation message on an optical fiber that connects the downstream network device to the upstream network device. In this example, the downstream network device may use a slot associated with control plane traffic to send the reservation message to the upstream network device. In another example, a separate data communication network may connect the downstream network device and the upstream network device. In this example, the downstream network device may send the reservation message to the upstream network device via the separate data communication network.

FIG. 7 is a flowchart that illustrates an example operation performed by the upstream network device in response to receiving a reservation message associated with a path. As shown in the example of FIG. 7, the upstream network device may receive the reservation message sent by the downstream network device (300). As discussed above, the reservation message may specify a slot selected by the downstream network device and a flow identifier selected by the downstream network device. In addition, the reservation message may include data that identify the path. The upstream network device may receive the reservation message prior to receiving traffic associated with the path.

In response to receiving the reservation message, the upstream network device may determine whether the upstream network device is an ingress network device for the path (302). The upstream network device may determine whether the upstream network device is the ingress network device for the path in various ways. For example, the reservation message may specify a destination address. In this example, the destination address may be an IP address. Furthermore, in this example, the upstream network device may determine that the upstream network device is the ingress network device if the destination address specified by the reservation message corresponds to an address of the upstream network device. In another example, the reservation message may include data that identify the path. In this example, the upstream network device may store data that identify paths for which the upstream network device is the ingress network device. Furthermore, in this example, the upstream network device may determine, based on the data in the reservation message that identify the path, whether the path is among the paths for which the upstream network device is the ingress network device.

In response to determining that the upstream network device is the ingress network device for the path ("YES" of 302), the upstream network device may determine whether the path is a backup path (304). In some examples, the upstream network device may determine whether the path is a backup path based on data in the reservation message. For instance, the upstream network device may determine whether the path is a backup path based on data in the reservation message that explicitly indicates that the path is a backup path. In another example, the upstream network device may determine whether the path is a backup path based on whether a slot specified by the reservation message is a virtual slot or a physical slot.

In response to determining that the path is a backup path ("YES" of 304), the upstream network device may identify, in a forwarding table of the upstream network device, an entry associated with a primary path that corresponds to the backup path (306). In the example of FIG. 1, if the path is backup path 12, the upstream network device may identify an entry associated with primary path 10. The upstream network device may identify the entry associated with the corresponding primary path in various ways. For example, the upstream network device may store one or more data structures that map identifiers of backup paths to identifiers of corresponding primary paths. In this example, the upstream network device may identify the entry associated with the corresponding primary path based on the one or more data structures.

After identifying the entry, the upstream network device may modify the identified entry (308). The upstream network device may modify the identified entry such that the backup downstream slot identifier of the entry identifies the slot specified by the reservation message. For example, if the reservation message specifies the virtual slot "114," the upstream network device may modify the backup downstream slot identifier of the identified entry such that the backup downstream slot identifier specifies "114." In addition, the upstream network device may modify the identified entry such that the backup downstream flow identifier of the identified entry identifies the flow identifier specified by the reservation message.

However, in response to determining that the path is not a backup path ("NO" of 304), the upstream network device may generate or modify, in a forwarding table of the upstream network device, an entry associated with the path (310). The entry may include a primary downstream port identifier, a primary downstream slot identifier, and a primary downstream flow identifier. The primary downstream port identifier may identify a port of the upstream network device on which the upstream network device is configured to send data units associated with the path. The primary downstream slot identifier may specify the slot specified by the reservation message. For example, if the reservation message specifies the physical slot "14," the upstream network device may modify the primary downstream slot identifier to specify the physical slot "14." The primary downstream flow identifier may identify the flow identifier specified by the reservation message.

In response to determining that the upstream network device is not the ingress network device for the path ("NO" of 302), the upstream network device may determine whether the path is a backup path (312). In response to determining that the path is a backup path ("YES" of 312), the upstream network device may select a virtual slot of an optical fiber that connects the upstream network device to an optical fiber further upstream on the path (314). In other words, the upstream network device may select a virtual slot of the path's upstream optical fiber. The upstream network device may select the virtual slot in various ways. For example, the upstream network device may select the virtual slot in any of the ways described above with regard to the downstream network device selecting a virtual slot. After selecting the virtual slot, the upstream network device may identify a physical slot that corresponds to the selected virtual slot (316).

On the other hand, in response to determining that the path is not a backup path ("NO" of 312), the upstream network device may select a physical slot of the optical fiber that connects the upstream network device to the optical network device that is further upstream on the path (318). In other words, the upstream network device may select a physical slot of the path's upstream optical fiber. The upstream network device may select the physical slot in various ways. For example, the upstream network device may select the physical slot in any of the ways described above with regard to the downstream network device selecting a physical slot.

Furthermore, in response to determining that the upstream network device is not the ingress network device for the path, the upstream network device may select a flow identifier (320). The upstream network device may select the flow identifier in various ways. For example, the upstream network device may select the flow identifier by generating a string based on the slot selected in steps 314 or 318 and the path's upstream port. In another example, the upstream network device may select the flow identifier based on the flow identifier specified by the reservation message. For instance, in this example, the upstream network device may select the flow identifier specified by the reservation message. In this way, the reservation message indicates the selected flow identifier. Thus, if each network device along the path selects the flow identifier specified by the reservation messages associated with the path, each network device along the path may use the same flow identifier in data units associated with the path.

The upstream network device may also generate or modify, in a forwarding table of the upstream network device, an entry associated with the path (322). In the example of FIG. 4, if the upstream network device is optical network device 100, the upstream network device may generate or modify, in forwarding table 104, an entry 106 associated with the path. The entry may include an upstream port identifier, an upstream slot identifier, a primary downstream port identifier, a primary downstream slot identifier, an upstream flow identifier, and a downstream flow identifier. The upstream port identifier may identify a port of the upstream network device previously identified as being the port on which the upstream network device receives data units associated with the path. If the path is a primary path, the upstream slot identifier may identify the selected physical slot of the path's upstream optical fiber. If the path is a backup path, the upstream slot identifier may identify the physical slot that corresponds to the selected virtual slot. The primary downstream port identifier may identify a port of the upstream network device previously identified as being the port on which the upstream network device sends data units associated with the path when the downstream segment of the path is operational. The primary downstream slot identifier may identify the slot specified by the reservation message. The upstream flow identifier may identify the selected flow identifier. The downstream flow identifier may identify the flow identifier specified by the reservation message.

In addition, the upstream network device may send a reservation ("res.") message to an optical network device that is further upstream on the path (324). For ease of explanation, this disclosure may refer to the reservation message received by the upstream network device as the first reservation message and may refer to the reservation message sent by the upstream network device as the second reservation message. In the example of FIG. 1, if the upstream network device is optical network device 4C and the path is backup path 12, the upstream network device may send the second reservation message to optical network device 4A. If the upstream network device is optical network device 4C and the path is path 14, the upstream network device may send the second reservation message to optical network device 4D.

The upstream network device may generate the second reservation message such that the second reservation message indicates the selected flow identifier. The second reservation message may indicate that the upstream network device has reserved the selected virtual or physical slot for the path. Furthermore, the upstream network device may generate the second reservation message such that the second reservation message includes data that identify the path.

Figure 8:
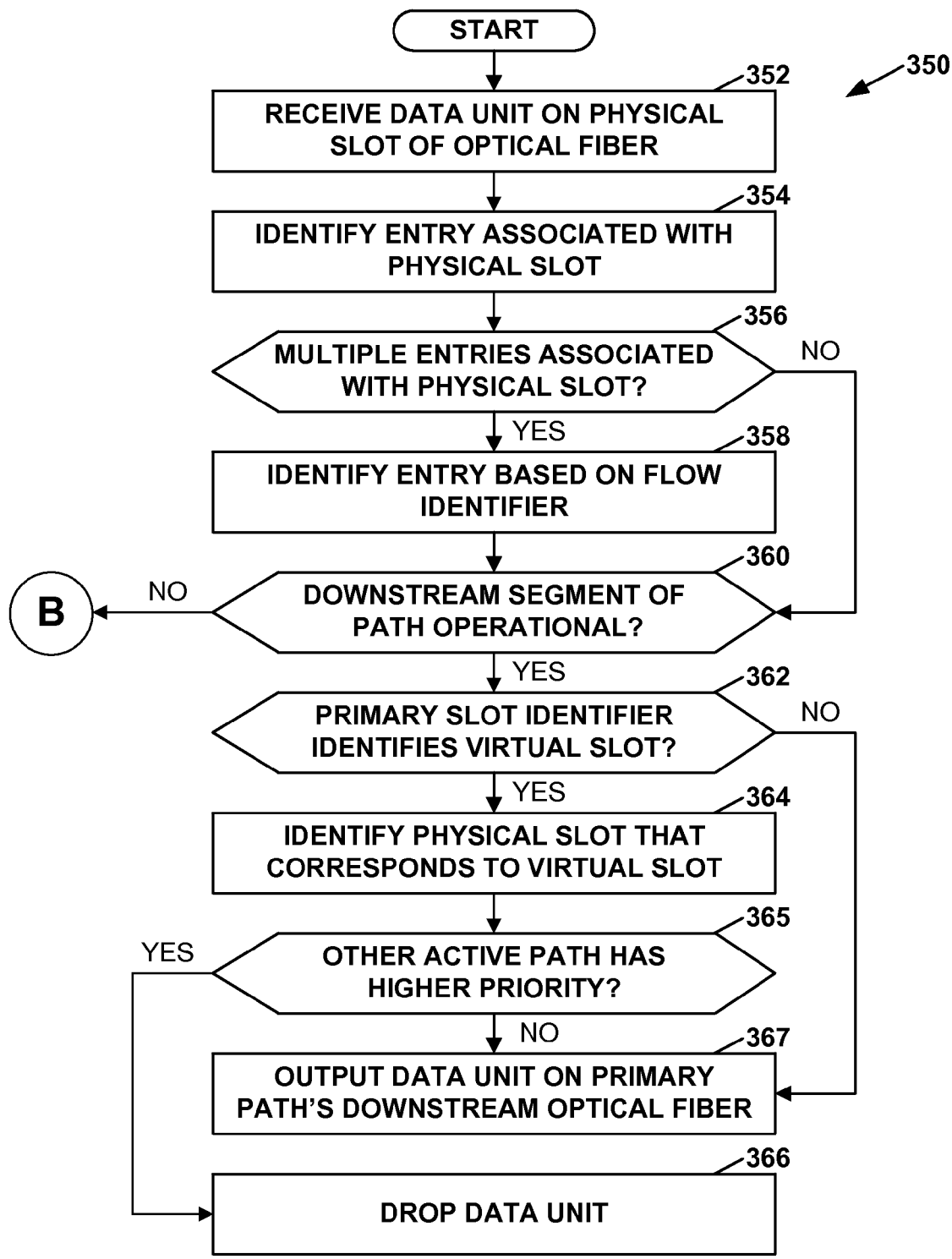
FIG. 8 is a flowchart that illustrates an example operation performed by an optical network device to route traffic.

FIG. 8 is a flowchart that illustrates an example operation 350 performed by an optical network device to route traffic. Each of optical network devices 4 may perform operation 350. In some examples, a forwarding ASIC, such as forwarding ASIC 102 (FIG. 4), performs operation 350. The optical network device may perform operation 350 with regard to each data unit in the traffic received on a physical slot of an optical fiber connected to the optical network device.

After the optical network device starts operation 350, the optical network device receives a data unit on the physical slot of the optical fiber (352). In response to receiving the data unit, the optical network device identifies one or more forwarding table entries associated with the physical slot (354). The optical network device may then determine whether there are multiple forwarding table entries associated with the physical slot (356).

If there are multiple forwarding table entries associated with the physical slot ("YES" of 356), the optical network device may identify the forwarding table entry associated with the data unit based on the flow identifier specified in the data unit (358). For example, the data unit may specify the flow identifier "twenty." In this example, the optical network device may identify the entry that includes an upstream flow identifier that specifies "twenty." If there is only a single forwarding table entry associated with the physical slot ("NO" of 354), the optical network device may not need to use the flow identifiers specified in the data units to identify the forwarding table entry associated with the data unit.

After identifying the forward table entry associated with the data unit, the optical network device may determine whether a downstream segment of a path associated with the identified entry is operational (360). If the downstream segment of the path is not operational ("NO" of 360), the optical network device may perform the portion of operation 350 shown in FIG. 9. If the downstream segment of the path is operational ("YES" of 360), the optical network device may determine whether the primary downstream slot identifier of the forwarding table entry associated with the path identifies a virtual slot of the path's primary downstream optical fiber (362). The path's primary downstream optical fiber is the optical fiber connected to the port identified by the relevant entry as the primary downstream port. If the primary downstream slot identifier identifies a virtual slot ("YES" of 362), the optical network device may identify a physical slot that corresponds to the virtual slot (364).

In some circumstances, the optical network device may reserve a first virtual slot for a first backup path and may reserve a second virtual slot for a second backup path. The first virtual slot and the second virtual slot may correspond to the same physical slot of the same downstream optical fiber. The first backup path may be associated with a first primary path and the second backup path may be associated with a second primary path. If segments of both the first and second primary paths become non-operational, data units may begin flowing on both the first backup path and the second backup path. In other words, both the first backup path and the second backup paths may become "active" paths. However, the optical network device may be unable to concurrently output data units associated with the first backup path and data units associated with the second backup path on the same physical slot of the same downstream optical fiber. Accordingly, the optical network device may drop the data units associated with the first backup path and output the data units associated with the second backup path, or vice versa.

In some examples, the optical network device may drop the data units associated with the first backup path or may drop the data units associated with the second backup path based on relative priorities of the first and second backup paths. The optical network device may determine the relative priorities of paths in various ways. For example, the optical network device may determine the relative priorities of paths based on the times at which the paths became active. In another example, the optical network device may determine the relative priorities of paths based on IP addresses of the ingress or egress network devices of the paths. In yet another example, the optical network device may be manually configured to provide higher priorities to certain paths that to other paths. In yet another example, the optical network device may be configured to provide higher priorities to manually established paths than to automatically established paths.

In the example of FIG. 8, after identifying the physical slot that corresponds to the virtual slot, the optical network device may determine whether another active path associated with the identified physical slot has higher priority than the path with which the data unit is associated (365). If another active path associated with the identified physical slot has higher priority ("YES" of 365), the optical network device may drop the data unit (366). In other words, the optical network device may not output the data unit.

However, in response to determining that no other active path associated with the identified physical slot has higher priority that the path with which the data unit is associated ("NO" of 365) or in response to determining in step 362 that the primary downstream slot identifier identifies a physical slot ("NO" of 362), the optical network device may output the data unit on the physical slot of the primary path's downstream optical fiber (367). In this way, the optical network device may output the data unit on the physical slot of the path's primary downstream optical fiber in response to determining that the primary downstream slot identifier identifies a physical slot of the path's primary downstream optical fiber. Thus, in response to determining that the primary downstream slot identifier identifies a virtual slot of the path's primary downstream optical fiber, the optical network device may identify, based on the virtual slot of the path's primary downstream optical fiber, a physical slot of the path's primary downstream optical fiber and may forward the data unit on the physical slot of the path's primary downstream optical fiber.

Figure 9:
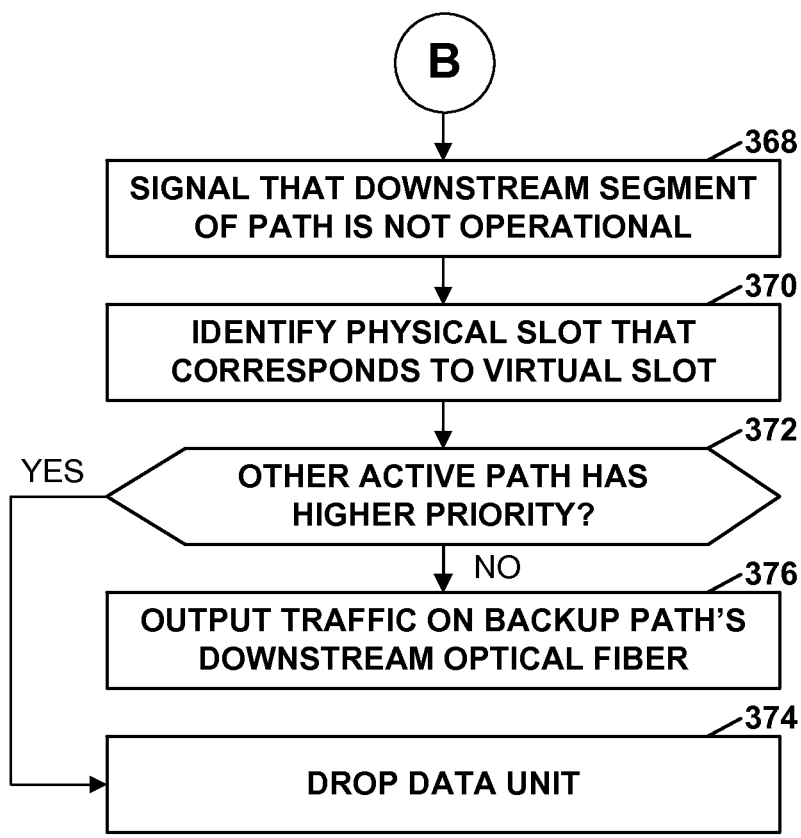
FIG. 9 is a flowchart that illustrates a continuation of the example operation of FIG. 8.

FIG. 9 is a flowchart that illustrates a continuation of the example operation of FIG. 8. If the downstream segment of the path is not operational, the optical network device may re-route data units from the path to the path's backup path. Accordingly, if the downstream segment of the path associated with the data unit is not operational ("NO" of 360), the optical network device may signal that the downstream segment of the path is not operational to an optical network device that is further upstream on the path (368). For instance, in the example of FIG. 1, optical network device 4C may send traffic on path 14. In this example, optical fiber optical fiber 8C may break, thereby causing the downstream segment of path 14 to be non-operational. Consequently, optical network device 4C may signal that the downstream segment of path 14 is not operational to the optical network device 4D. In response to receiving such signaling, optical network device 4D may route the traffic associated with path 14 onto a backup path for path 14 (not shown). In this way, the optical network device may transmit, in response to determining that the downstream segment of the path is not operational, a message to an upstream network device on the path, the message indicating that the downstream segment of the path is not operational. In some examples, upstream and downstream directions may be co-routed and error patterns may be inserted in the return direction such that the upstream network device is able to determine that the downstream segment of the path is not operational. In such examples, the optical network device may send a message that includes a backward defect indication (BDI) to the upstream network device.

The optical network device may send the message in various ways. For example, the optical network device may send a control plane message, e.g. a path-error, to the upstream network device in RSVP. This however may be considered to be a 'slow path' that may require time in the order of 10ths of milliseconds to complete. In another example, ITU standards (G.709 or G.707) define an overhead signal (RDI) in the data plane that optical network devices may use to immediately identify the failed segment. In this example, the upstream optical network device may switch traffic to a different path in response to receiving an RDI message from the optical network device. Such switching may occur in less than 1 millisecond.

In addition, the optical network device may identify a physical slot that corresponds to the virtual slot specified by the backup downstream slot identifier of the relevant entry (370). After identifying the physical slot in step 370, the optical network device may determine whether another active path associated with the identified physical slot has higher priority than the path with which the data unit is associated (372). If the other active path has higher priority ("YES" of 372), the optical network device may drop the data unit (374). Otherwise, in response to determining that no other active path associated with the identified physical slot has higher priority than the path with which the data unit is associated ("NO" of 372), the optical network device may output the data unit on the identified physical slot of the backup path's downstream optical fiber (376). In other words, the optical network device may output the data unit on the physical slot of the backup downstream port identified by the relevant entry.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general- or special-purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

Various examples have been described. These and other examples are within the scope of the following claims.

What is claimed is:

1. A method comprising:
   receiving, at an optical network device, traffic on a physical slot of a first optical fiber, the first optical fiber connected to a first port of the optical network device, the traffic including a given data unit;
   determining, based on the given data unit being received by the optical network device on the physical slot of the first optical fiber and based on a flow identifier specified by the given data unit, that the given data unit is associated with a first path;
   determining whether a downstream segment of the first path is operational; and
   in response to determining that the downstream segment of the first path is not operational:
      identifying a virtual slot of a second optical fiber that is connected to the optical network device, the virtual slot of the second optical fiber reserved for a second path, wherein reserving virtual slots for a path does not reserve bandwidth associated with physical slots corresponding to the virtual slots;
      identifying, based on the virtual slot of the second optical fiber, a physical slot of the second optical fiber; and
      forwarding the given data unit on the physical slot of the second optical fiber.

2. The method of claim 1, wherein the physical slot of the first optical fiber and the physical slot of the second optical fiber are time slots or wavelength slots.

3. The method of claim 1,
   wherein identifying the virtual slot of the second optical fiber comprises identifying, by the optical network device based on the given data unit being received on the physical slot of the first optical fiber and based on the flow identifier, a forwarding table entry associated with the first path, and wherein the forwarding table entry includes a primary downstream port identifier, a backup downstream port identifier, a primary downstream slot identifier, and a backup downstream slot identifier, the primary downstream port identifier identifying a port of the optical network device that is connected to a third optical fiber, the backup downstream port identifier identifying a port of the optical network device that is connected to the second optical fiber, the primary downstream slot identifier identifying a slot of the third optical fiber, the backup downstream slot identifier identifying the virtual slot of the second optical fiber.

4. The method of claim 3, wherein an Application-Specific Integrated Circuit (ASIC) stores a forwarding table that contains the forwarding table entry; and wherein the ASIC identifies the forwarding table entry, determines whether the downstream segment of the first path is operational, and identifies the physical slot of the second optical fiber.

5. The method of claim 3, wherein the forwarding table entry is a first forwarding table entry; and wherein identifying the first forwarding table entry comprises:

determining whether there are multiple forwarding table entries that are associated with the physical slot of the first optical fiber;

in response to determining that there are multiple forwarding table entries that are associated with the physical slot of the first optical fiber, determining whether the first forwarding table entry specifies the flow identifier specified by the given data unit; and identifying the first forwarding table entry as the forwarding table entry associated with the first path in response to determining that the first forwarding table entry specifies the flow identifier specified by the given data unit.

6. The method of claim 3 further comprising, in response to determining that the downstream segment of the first path is operational:

forwarding the given data unit on a first physical slot of the third optical fiber in response to determining that the primary downstream slot identifier identifies the first physical slot of the third optical fiber; and in response to determining that the primary downstream slot identifier identifies a virtual slot of the third optical fiber:

identifying, based on the virtual slot of the third optical fiber, a second physical slot of the third optical fiber; and forwarding the given data unit on the second physical slot of the third optical fiber.

7. The method of claim 3 further comprising:

receiving a first message at the optical network device prior to receiving the traffic, the first message indicating that a downstream network device on the first path has reserved the slot of the third optical fiber for the first path;

receiving a second message at the optical network device prior to receiving the traffic, the second message indicating a downstream network device on the second path has reserved the virtual slot of the second optical fiber for the second path; and generating the forwarding table entry in response to receiving the first message and the second message.

8. The method of claim 3 further comprising:

receiving a first message at the optical network device prior to receiving the traffic, the first message indicating that a downstream network device on the first path has reserved the slot of the third optical fiber for the first path;

selecting, in response to receiving the first message, the physical slot of the first optical fiber; and sending a second message to an upstream network device on the first path, the second message indicating that the optical network device has reserved the physical slot of the first optical fiber for the first path.

9. The method of claim 8, wherein the second message indicates the flow identifier.

10. The method of claim 9, wherein the flow identifier is a first flow identifier;

wherein the first message indicates a second flow identifier; and wherein the method further comprises:

selecting the first flow identifier in response to receiving the first message;

modifying, in response to determining that the downstream segment of the first path is operational, the given data unit such that the given data unit specifies the second flow identifier; and after modifying the given data unit, forwarding the given data unit on the third optical fiber.

11. The method of claim 1, further comprising transmitting, by the optical network device, in response to determining that the downstream segment of the first path is not operational, a message to an upstream network device on the first path, the message indicating that the downstream segment of the first path is not operational.

12. The method of claim 1, wherein identifying the physical slot of the second optical fiber comprises calculating an identifier of the physical slot of the second optical fiber by calculating an identifier of the virtual slot mod n, where n indicates a total number of physical slots of the second optical fiber.

13. The method of claim 1, wherein a trail trace identifier field of the given data unit specifies the flow identifier.

14. The method of claim 1, wherein the second path is a backup path to the first path.

15. An optical network device comprising:

a first port and a second port; and a processor configured to:

receive traffic on a physical slot of a first optical fiber, the first optical fiber connected to the first port, the traffic including a given data unit;

determine, based on the given data unit being received by the optical network device on the physical slot of the first optical fiber and based on a flow identifier specified by the given data unit, that the given data unit is associated with a first path;

determine whether a downstream segment of the first path is operational; and in response to determining that the downstream segment of the first path is not operational:

identify a virtual slot of a second optical fiber, the second optical fiber connected to the second port, the virtual slot of the second optical fiber being reserved for a second path, wherein reserving virtual slots for a path does not reserve bandwidth associated with physical slots corresponding to the virtual slots;

identify, based on the virtual slot of the second optical fiber, a physical slot of the second optical fiber; and forward the given data unit on the physical slot of the second optical fiber.

16. The optical network device of claim 15, wherein the physical slot of the first optical fiber and the physical slot of the second optical fiber are time slots or wavelength slots.

17. The optical network device of claim 15, wherein the processor is further configured to identify, based on the given data unit being received on the physical slot of the first optical fiber and based on the flow identifier, a forwarding table entry associated with the first path, and wherein the forwarding table entry includes a primary downstream port identifier, a backup downstream port identifier, a primary downstream slot identifier, and a backup downstream slot identifier, the primary downstream port identifier identifying a port of the optical network device that is connected to a third optical fiber, the backup downstream port identifier identifying a port of the optical network device that is connected to the second optical fiber, the primary downstream slot identifier identifying a slot of the third optical fiber, the backup downstream slot identifier identifying the virtual slot of the second optical fiber.

18. The optical network device of claim 17 wherein the processor is an Application-Specific Integrated Circuit (ASIC) that stores a forwarding table that contains the forwarding table entry, wherein the ASIC identifies the forwarding table entry, determines whether the downstream segment of the first path is operational, and identifies the physical slot of the second optical fiber.

19. The optical network device of claim 17,
wherein the forwarding table entry is a first forwarding table entry; and
wherein as part of identifying the first forwarding table entry, the processor:
determines whether there are multiple forwarding table entries that are associated with the physical slot of the first optical fiber;
determines, in response to determining that there are multiple forwarding table entries that are associated with the physical slot of the first optical fiber, whether the first forwarding table entry specifies the flow identifier specified by the given data unit; and
identifies the first forwarding table entry as the forwarding table entry associated with the first path in response to determining that the first forwarding table entry specifies the flow identifier specified by the given data unit.

20. The optical network device of claim 17, wherein the processor is further configured to:
forward the given data unit on a first physical slot of the third optical fiber in response to determining that the primary downstream slot identifier identifies the first physical slot of the third optical fiber;
identify, in response to determining that the primary downstream slot identifier identifies a virtual slot of the third optical fiber;
identify, based on the virtual slot of the third optical fiber, a second physical slot of the third optical fiber; and
forward the given data unit on the second physical slot of the third optical fiber.

21. The optical network device of claim 17, wherein the processor is further configured to:
receive a first message at the optical network device prior to receiving the traffic, the first message indicating that a downstream network device on the first path has reserved the slot of the third optical fiber for the first path;
receive a second message at the optical network device prior to receiving the traffic, the second message indicating a downstream network device on the second path has reserved the virtual slot of the second optical fiber for the second path; and
generate the forwarding table entry in response to receiving the first message and the second message.

22. The optical network device of claim 17, wherein the processor is configured to:
receive a first message at the optical network device prior to receiving the traffic, the first message indicating that a downstream network device on the first path has reserved the slot of the third optical fiber for the first path;
select, in response to receiving the first message, the physical slot of the first optical fiber; and
send a second message to an upstream network device on the first path, the second message indicating that the optical network device has reserved the physical slot of the first optical fiber for the first path.

23. The optical network device of claim 22, wherein the second message indicates the flow identifier.

24. The optical network device of claim 23,
wherein the flow identifier is a first flow identifier;
wherein the first message indicates a second flow identifier;
wherein the processor is configured to:
select the first flow identifier in response to receiving the first message;
modify, in response to determining that the downstream segment of the first path is operational, the given data unit such that the given data unit specifies the second flow identifier; and
after modifying the given data unit, forward the given data unit on the third optical fiber.

25. The optical network device of claim 15, wherein the processor is configured to transmit in response to determining that the downstream segment of the first path is not operational, a message to an upstream network device on the first path, the message indicating that the downstream segment of the first path is not operational.

26. The optical network device of claim 15, wherein the processor calculates an identifier of the physical slot of the second optical fiber by calculating an identifier of the virtual slot mod n, where n indicates a total number of physical slots of the second optical fiber.

27. The optical network device of claim 15, wherein a trail trace identifier field of the given data unit specifies the flow identifier.

28. The optical network device of claim 15, wherein the second path is a backup path to the first path.

29. A non-transitory computer-readable storage medium that comprises computer-executable instructions that, when executed, configure a processor of an optical network device to:
receive traffic on a physical slot of a first optical fiber, the first optical fiber connected to a first port of the optical network device, the traffic including a given data unit;
determine, based on the given data unit being received by the optical network device on the physical slot of the first optical fiber and based on a flow identifier specified by the given data unit, that the given data unit is associated with a first path;
determine whether a downstream segment of the first path is operational; and in response to determining that the downstream segment of the first path is not operational:
  identify a virtual slot of a second optical fiber that is connected to the optical network device, the virtual slot of the second optical fiber reserved for a second path, wherein reserving virtual slots for a path does not reserve bandwidth associated with physical slots corresponding to the virtual slots;
  identify, based on the virtual slot of the second optical fiber, a physical slot of the second optical fiber; and
  forward the given data unit on the physical slot of the second optical fiber.

* * * * *